Patented Oct. 10, 1944

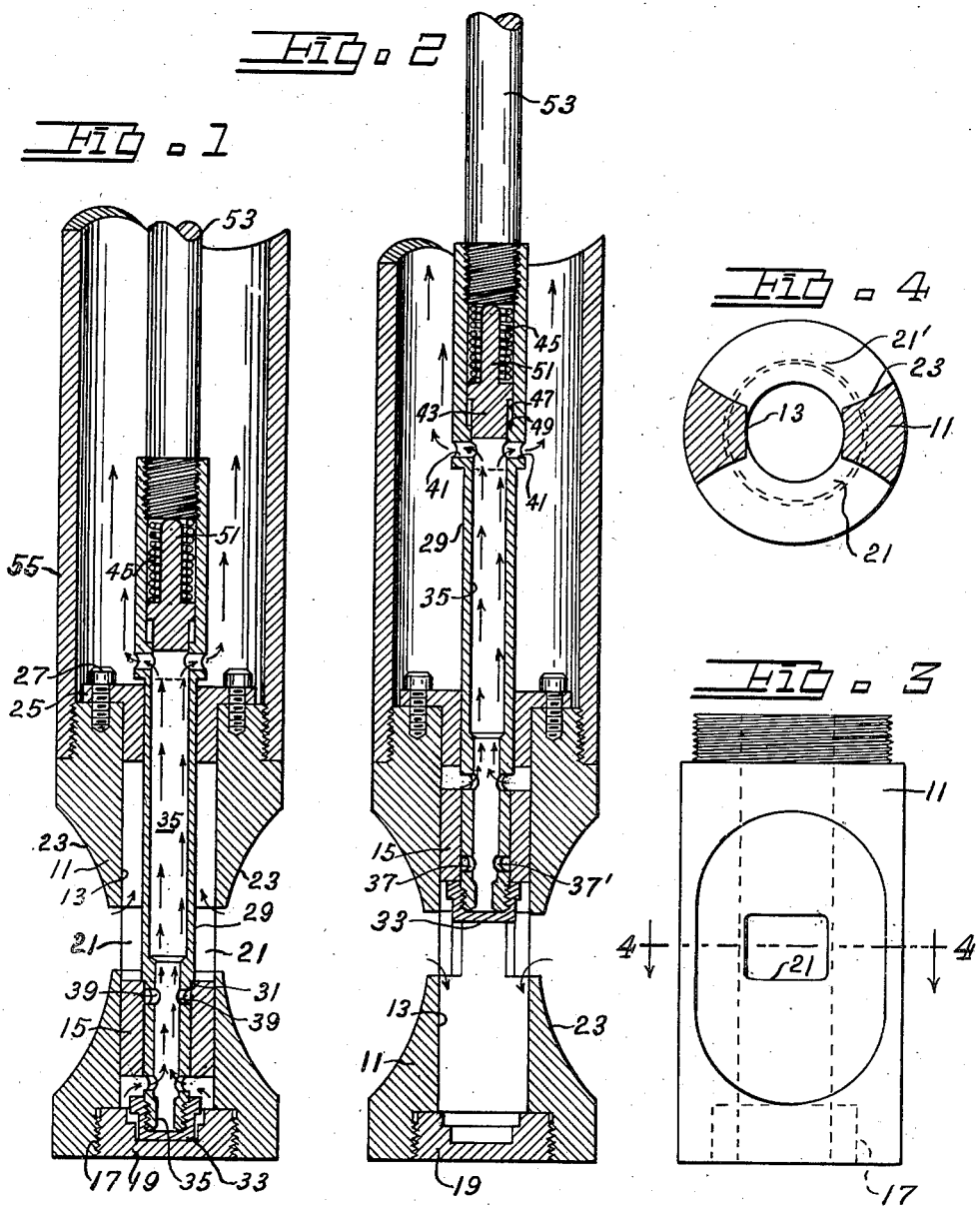

2,360,139

UNITED STATES PATENT OFFICE 2,360,139

PUMP

Harry W. Johnstone, Detroit, Mich., assignor to Frederick L. Johnstone, doing business as Johnstone Pump Company, Wayne County, Mich.

Application July 12, 1943, Serial No. 494,429

7 Claims. (Cl. 103—192)

My invention pertains to fluid moving apparatus and more particularly to pumps.

It is an object of my invention to provide an improved pump of a minimum number of movable parts, of a simple rugged construction and which is reliable and positive in operation.

It is also an object of my invention to provide an improved pump which is especially effective for pumping heavy liquids, such as putty, calking and sealing compounds and the like, for example.

It is a further object of my invention to provide a pump which pumps from both sides of the piston and which comprises only two valves or a total of three movable parts.

Further objects and advantages are within the scope of the invention, such as relate to the arrangement, operation and function of the related elements of the structure, to various details of construction and to combinations of parts, elements, per se, and to economies of manufacture and numerous other features as will be apparent from a consideration of the specification in conjunction with the drawing disclosing specific embodiments of the invention, in which:

Fig. 1 is a longitudinal view showing the parts of the pump moved to one extreme position;

Fig. 2 is a similar view showing the parts of the pump moved to the other extreme position;

Fig. 3 is a side elevational view showing the material cylinder and looking into one of the inlet ports; and Fig. 4 is a cross-sectional view on line 4—4 of Fig. 3.

Referring more specifically to the Figs. 1 through 4 of the drawing, my improved pump comprises a cylinder 11 having a bore 13 for guiding a piston 15 slidable therein in a snug fluid sealing relation. The lower end of the cylinder bore is closed in any suitable manner, as by providing an enlarged counter-bore 17 which is internally threaded for receiving a plug 19 screwed snugly therein.

Opening through the side walls of the cylinder 11 at a point substantially at the center, or middle, of the axial length of the cylinder, I provide an inlet port 21 the outer end of which preferably opens in a wide flaring mouth or bell 23 to facilitate the flowing of heavy liquids and materials into the cylinder. To provide ample inlet capacity for heavy materials, a second inlet port 21' may similarly open into the other side of the cylinder, and a plurality of such inlet ports may open in at the same axial position, as will be understood.

The upper end of the cylinder is closed by a closure member or cylinder head 25 secured thereon by screws 27 and centrally apertured for passing a piston rod 29 slidably therethrough into the cylinder for reciprocating the piston 15 which is in the form of a cylindrical piston sleeve. The piston rod 29 is arranged to slide through the piston sleeve 15 with a predetermined amount of axial free movement relative thereto, after which the piston sleeve is forced to move with the piston rod. The amount of relative free sliding movement is definitely predetermined, which is accomplished in a simple and rugged construction, by turning down to a smaller diameter the portion of the piston rod 29 whereon the piston sleeve 15 slides in order to provide a shoulder 31 for rigidly abutting the upper end of the piston sleeve to force it down to the bottom of the cylinder. The lower end of the piston rod 29 is turned to a smaller diameter and externally threaded to receive a cap 33 the shoulder of which abuts the lower end of the piston sleeve 15 to force it upwardly. The length of the piston sleeve 15 is suitably selected with reference to the length of its stroke and the length of the cylinder so that the inlet port is opened to opposite ends of the cylinder alternatively as the piston moves to opposite ends of the cylinder.

The cap 33 on the lower end of the piston rod 15 serves also to close the lower end of an aperture or discharge passage 35 extending axially through the piston rod, which is of a tubular conformation. An outlet port 37 opens through the side wall of the tubular piston rod 29 at a position just sufficiently above the cap 33 to be covered and closed by the piston sleeve 15 when it is in the lowest position on the piston rod and in engagement with the cap. Another corresponding outlet port 37', or any desired number of corresponding outlet ports, may be provided in the piston rod at the same axial distance from the cap 33 to provide ample discharge capacity on the down stroke. A second outlet port 39 opens into the axial aperture in the piston rod 29 at a point sufficiently below the shoulder 31 to be covered and closed by the piston sleeve 15 while moving downwardly. Another outlet port 39', of which there may be any desired number, may be provided at the same axial position as said second outlet port 39, for providing an ample discharge capacity when the piston is moving upwardly.

The material pumped up the aperture 35 in the piston rod is discharged from the upper end which is provided with a discharge port 41 opening transversely through the side wall of the tubular piston rod. As will be understood, a plurality of such discharge ports 41 may be provided in circumferentially spaced relation for ample capacity. For restricting reverse flow, a sliding check valve 43 is provided in the piston rod 29 in the upper end of the axial aperture where it is opened for discharge by fluid pressure against a compression spring 45 which tends to close the valve over the discharge ports 41 to prevent reverse flowing fluid entering the pump. The upper end of the valve 43 is preferably of an enlarged diameter sliding in a counter-bore 47 of larger diameter providing a shoulder 49 which engages and limits the lowermost position of the valve, represented dotted, in the upper end of the piston rod for closing the discharge ports. A spring guide 51 rises from the upper end of the valve concentrically through the compression spring. The upper end of the tubular piston rod is adapted for receiving a driving connection, in any suitable manner, as by being internally threaded to receive a pump rod 53 therein. The spring guide pin 51 may be made of sufficient length to also limit the uppermost position of the valve by engaging the inserted end of the pump rod 53 when the valve is open, as shown. The valve and its compression spring are conveniently assembled by insertion into the upper end of the tubular piston rod, and the insertion of the pump rod 53 compresses and holds the spring on the valve.

A cylindrical casing 55 secured to the upper end of the cylinder casting 11, as by threaded attachment, and extending therefrom in concentric relation to the piston and pump rods, serves to insert the cylinder firmly down into any barrel, cask or other container having heavy liquids and other materials to be pumped, serves to hold it firmly while the pump is being worked, and serves to receive and lead the pumped material away from the discharge ports from the upper end of the piston rod. To provide a smooth compact assembly, free from unsymmetrical projections, the casing 55 is preferably of the same outside diameter as the pump cylinder 11, the upper end of the latter being turned down and threaded to fit internal threads in the end of the casing. The upper end of the casing may be closed by any suitable closure (not shown) through which the pump rod may extend and the pumped material be delivered, in a usual manner.

*Operation*

Starting with the pump elements in the positions shown in Fig. 1, the piston rod 29 is drawn upwardly. The piston sleeve 15 remains stationary until the second outlet port 39 is lifted above the upper end of the piston sleeve and is opened, and the first or lower outlet port 37 is drawn up into the piston sleeve and is covered and closed. The shoulder of the cap 33 then engages the lower end of the piston sleeve 15 and forces it to rise forming a vacuum in the lower end of the cylinder. When the upper end of the piston sleeve 15 passes the upper marginal edge of the inlet port 21 in the cylinder wall, it traps the liquid or material previously charged into the upper end of the cylinder 11 by the opposite or previous reverse movement of the piston. Continued upward movement applies a high pressure on this trapped liquid which is then forced to flow into the upper outlet ports 39, up through the axial passage 35 in the tubular piston rod lifting the check valve 43 and entering the large upper casing 55, as represented by the arrows in Fig. 2.

As the lower end of the piston sleeve 15 rises above the lower marginal edge of the centrally positioned inlet port 21 it connects this inlet port into the lower end of the cylinder 11 wherein a partial vacuum has already been formed by the evacuation by the piston. The heavy liquid or material to be pumped, then rushes into and charges the lower end of the cylinder, as represented by the arrows in Fig. 2.

On the down stroke of the piston, the outlet ports 37 are opened by being carried down below the piston sleeve 15, and the upper ports 39 are closed by being carried into the piston. Then the shoulder 31 on the piston rod engages the upper end of the piston sleeve 15 and forces it down; causing a partial vacuum in the upper end of the cylinder; opening the inlet port 21 into the upper end and charging the upper end of the cylinder; and forcing the material, trapped in the lower end of the cylinder by the previous up movement, to flow up the hollow piston rod, through the check valve 43 and into the large casing 55, as represented by the arrows in Fig. 1. This cycle of operation is repeated. Because of the sliding nature of the valve arrangements used, eliminating all ball valves and seats, particles of matter can not hold the valves open and interfere with the positive operation of the pump.

It will be seen that I have provided an improved pump which is especially suitable, reliable and positive in operation for pumping heavy liquids and materials, and which is of a simple rugged construction, convenient to manufacture, assemble and maintain.

It is apparent that within the scope of my invention modifications and different arrangements may be made other than herein disclosed, and the present disclosure is illustrative merely, the invention comprehending variations thereof.

I claim:

1. A double acting pump for pumping from both ends of the cylinder comprising, a cylinder, a tubular piston rod, closure means closing one end of the cylinder and passing the piston rod therethrough, a piston sleeve slidably disposed on said piston rod in the cylinder, means determining relative movement to permit the rod to have a limited amount of axial movement relative thereto, an inlet port in the middle of the cylinder sidewalls, the length of said piston sleeve and cylinder being such that the inlet port is opened to opposite ends of the cylinder alternatively as the piston moves to opposite ends, and two outlet ports spaced axially in the tubular piston rod to be alternatively closed and opened by the relative movements between the piston sleeve and the rod for successively discharging therethrough fluid charged into the opposite ends of the cylinder by each opposite or previous reverse movement of the piston.

2. In combination in a three movable element double acting pump, a cylinder, a tubular piston rod having an axial aperture passing therethrough, closure means closing one end of said cylinder and passing said piston rod slidably therethrough, a piston sleeve slidably disposed on the end of the piston rod in the cylinder, means limiting the relative axial movement between the rod and the piston sleeve, an inlet port opening into the cylinder at a central position, the length and stroke of said piston sleeve being so related to the axial length of the cylinder and inlet port that said inlet port is alternatively opened to each opposite end of the cylinder evacuated by the piston, two outlet ports spaced axially in the tubular piston rod to be alternatively or selectively opened and closed by the relative axial movements between the piston sleeve and the piston rod for successively discharging through the piston rod the fluid charged into opposite ends of the cylinder by each opposite or previous reverse movement of the piston, the outer end of said piston rod being adapted for a driving connection, and a large capacity reverse flow restricting valve cooperatively associated with the axial aperture in the piston rod.

3. In a pump the combination of, a cylinder having a piston receiving bore, a hollow piston rod having an aperture extending axially therein, a centrally apertured cylinder head secured on said cylinder for closing one end thereof and for passing said piston rod slidably therethrough, an inlet port opening through a central portion of the cylinder side wall, a piston sleeve slidably disposed on the inserted end of said piston rod for movement relative thereto, means limiting the relative movement between said piston sleeve and rod to a predetermined axial movement after which the piston sleeve moves with the rod, said piston sleeve being of a suitable length relative to the axial length of the cylinder and inlet port to clear the inlet port in the center of the cylinder when the piston sleeve is moved toward either end of the cylinder, and a pair of ports opening from the aperture in the piston rod through the side walls thereof at points suitably spaced axially to be selectively opened and closed as the piston rod slides back and forth in the piston sleeve to alternately discharge from either end of the cylinder fluid which was charged thereinto by the previous movement of the piston toward the other end of the cylinder.

4. A pump comprising, a cylinder having a piston receiving bore, a hollow piston rod having an aperture extending axially therein, a centrally apertured cylinder head secured on said cylinder for closing one end thereof and for passing said piston rod slidably therethrough, an inlet port opening through a central portion of the cylinder side wall, a piston sleeve slidably disposed on the inserted end of said piston rod for movement relative thereto, means limiting the relative movement between said piston sleeve and rod to a predetermined axial movement after which the piston sleeve moves with the rod to either end of the cylinder, said piston sleeve being of a length relative to the axial length of the cylinder and the inlet port to clear the inlet port in the center of the cylinder when the piston sleeve is moved to either end of the cylinder, a pair of ports opening from the aperture in the piston rod through the side walls thereof at points suitably spaced axially to be selectively opened and closed as the piston rod slides back and forth in the piston sleeve to alternately discharge from either end of the cylinder fluid which was charged thereinto by the previous movement of the piston, and a large capacity check valve responsive to fluid pressure for discharging pump fluid from the axial aperture in the piston rod and for restricting the reverse flow of fluid therein.

5. In fluid pumping apparatus the combination of, a cylinder having a piston receiving bore, a hollow piston rod having an aperture extending axially therein, a centrally apertured cylinder head secured on said cylinder for closing one end thereof and for passing said piston rod slidably therethrough, an inlet port opening through a central portion of the cylinder side wall, a piston sleeve slidably disposed on the inserted end of said piston rod for movement relative thereto, means limiting the relative movement between said piston sleeve and rod to a predetermined axial movement after which the piston sleeve moves with the rod to either end of the cylinder, said piston sleeve being of a length suitable in relation to the axial length of the cylinder and the inlet port to clear the inlet port in the center of the cylinder when the piston sleeve is moved to either end of the cylinder, a pair of ports opening from the aperture in the piston rod through the side walls thereof at points suitably spaced axially to be selectively opened and closed as the piston rod slides back and forth in the piston sleeve to alternately discharge from either end of the cylinder fluid which was charged thereinto by the previous movement of the piston toward the other end of the cylinder, the axial aperture in the outer end of the piston rod having an enlarged counter-bore, a valve slidably disposed in the enlarged counter-bore and having a port closing extension projecting into the axial passage, a compression spring for urging the valve to engage the shoulder between the axial passage and the enlarged counter-bore, and an outlet port opening laterally from said axial passage through the sidewall of the piston at a point to be closed by said extension when the valve is engaged on said shoulder.

6. A double acting pump comprising, a material cylinder, a tubular piston rod, closure means closing one end of the cylinder and passing the piston rod therethrough, a piston sleeve slidably disposed on said piston rod in the cylinder, means determining relative movement to permit the rod to have a limited amount of axial movement relative thereto, an inlet port in the middle of the cylinder side walls, the axial lengths of said piston sleeve, cylinder and inlet port being such that the inlet port is opened to opposite ends of the cylinder alternatively as the piston moves to opposite ends, two outlet ports spaced axially in the tubular piston rod to be alternatively closed and opened by the relative movements between the piston sleeve and the rod for successively discharging therethrough the material charged into the opposite ends of the cylinder by each opposite or previous reverse movement of the piston, the outer portion of said piston rod being adapted for connection with driving means, a discharge port opening through the side wall of the portion of the tubular piston rod outside of the cylinder for discharging pumped material, a check valve sliding in the outer portion of said tubular piston rod, a spring continuously urging said sliding valve toward a position for closing said discharge port from which position the sliding valve may be opened by the pressure of material to be discharged.

7. A double acting pump for pumping from both sides of the piston comprising, a cylinder, a tubular piston rod, closure means closing one end of the cylinder and passing the piston rod slidably therethrough, a piston slidably disposed on said piston rod to permit the rod to have a limited amount of axial movement relative thereto, an inlet port through the central portion of the cylinder sidewall, the axial lengths of said piston, cylinder and inlet port being arranged so that the inlet port is opened to opposite ends of the cylinder alternatively as the piston moves to opposite ends, and outlet port means so controlled by the relative movements between the piston and the rod as to successively discharge through said tubular piston rod the fluid charged into the opposite ends of the cylinder by each opposite or previous reverse movement of the piston.

HARRY W. JOHNSTONE.